(12) United States Patent
Baumgärtner et al.

(10) Patent No.: US 12,742,477 B2
(45) Date of Patent: Sep. 22, 2026

(54) LUBRICATION RING FOR TRANSPORTING LUBRICANT

(71) Applicant: Sulzer Management AG, Winterthur (CH)

(72) Inventors: Benedict Baumgärtner, Karlsdorf-Neuthard (CH); Pascal Kiesecker, Bruchsal (CH)

(73) Assignee: SULZER MANAGEMENT AG, Winterthur (CH)

( * ) Notice: Subject to any disclaimer, the term of this patent is extended or adjusted under 35 U.S.C. 154(b) by 113 days.

(21) Appl. No.: 18/422,838

(22) Filed: Jan. 25, 2024

(65) Prior Publication Data

US 2024/0263672 A1 Aug. 8, 2024

(30) Foreign Application Priority Data

Feb. 8, 2023 (EP) .................................... 23155553

(51) Int. Cl.
*F16C 33/66* (2006.01)

(52) U.S. Cl.
CPC ...... *F16C 33/6681* (2013.01); *F16C 33/6651* (2013.01)

(58) Field of Classification Search
CPC F16C 33/6681; F16C 33/6651; F16C 19/163; F16C 19/543; F16C 33/6666; F16C 33/6659
See application file for complete search history.

(56) References Cited

U.S. PATENT DOCUMENTS 2,045,026 A * 6/1936 Rosendahl ................ F16N 7/18 384/404
2,950,943 A * 8/1960 Forrest ...................... F16N 7/26 384/468
4,144,950 A * 3/1979 Moyer .................... F01D 25/20 60/39.08
5,051,007 A * 9/1991 Maddox ............. F16C 33/6659 384/465
5,328,275 A * 7/1994 Winn .................... F16C 33/664 384/589
5,499,902 A * 3/1996 Rockwood ........... H02K 49/106 417/423.12

(Continued)

FOREIGN PATENT DOCUMENTS

GB 00348 3/1912
GB 2448616 A * 10/2008 ............... F16N 7/24

(Continued)

OTHER PUBLICATIONS

WO-2015098896—Machine Translation (Year: 2015).*
European Search Report issued Jul. 6, 2023 in corresponding European Application No. 23155553.3.

*Primary Examiner* — Michael A Riegelman
(74) *Attorney, Agent, or Firm* — Spencer Fane, LLP

(57) ABSTRACT

A lubrication ring for the transport of a lubricant from a lubricant container in a bearing, the lubrication ring to be driven by a rotating shaft, which is borne by the bearing. The lubrication ring includes a running surface configured to interoperate with the shaft, and a transport surface configured to transport lubricant, the transport surface having a plurality of pockets to transport of the lubricant, the plurality of pockets arranged adjacent to each other in a circumferential direction of the lubrication ring.

20 Claims, 6 Drawing Sheets

(56) References Cited

U.S. PATENT DOCUMENTS

| | | | | | |
|---|---|---|---|---|---|
| 5,513,964 | A * | 5/1996 | Rockwood | F16N 7/16 | 417/423.13 |
| 5,591,020 | A * | 1/1997 | Rockwood | B05D 7/00 | 417/423.12 |
| 5,743,658 | A * | 4/1998 | Vollmer | H02K 5/1672 | 384/406 |
| 6,460,656 | B1 * | 10/2002 | Jones, Jr. | F16C 33/664 | 184/13.1 |
| D589,597 | S * | 3/2009 | Bloch | D23/249 | |
| 9,976,597 | B2 * | 5/2018 | Floan | F16C 33/043 | |
| 10,288,081 | B1 * | 5/2019 | Maxwell, III | F04D 13/021 | |
| 10,837,447 | B2 * | 11/2020 | Kimura | F16C 33/6659 | |
| 2002/0146315 | A1 * | 10/2002 | Rockwood | F16N 7/38 | 415/111 |
| 2006/0193545 | A1 * | 8/2006 | Bridges | F16C 33/3843 | 384/470 |
| 2012/0219403 | A1 * | 8/2012 | Riley | F04D 29/061 | 415/170.1 |
| 2015/0308306 | A1 * | 10/2015 | Nation | F16N 7/18 | 184/13.1 |
| 2016/0040720 | A1 * | 2/2016 | Ohr | F16C 33/6666 | 184/14 |
| 2024/0263672 | A1 * | 8/2024 | Baumgärtner | F16C 19/543 | |
| 2025/0237350 | A1 * | 7/2025 | Rozputynski | G01M 13/04 | |

FOREIGN PATENT DOCUMENTS

| | | | | |
|---|---|---|---|---|
| JP | 5205984 | B2 * | 6/2013 | |
| WO | 9311381 | A1 | 6/1993 | |
| WO | WO-2015098896 | A1 * | 7/2015 | F16C 33/6685 |

* cited by examiner 101
10
20
100
103
102
10
A

A
L
20
2
4
1
22
21
413
41
41
412
4
411
6
1
3
10

1
11
111
113
112
113
112
131
132
13

LUBRICATION RING FOR TRANSPORTING LUBRICANT

CROSS-REFERENCE TO RELATED APPLICATION

This application claims priority to European application Ser. No. 23155553.3, filed Feb. 8, 2023, the contents of which are hereby incorporated by reference in its entirety.

BACKGROUND

Technical Field

The disclosure is directed to a lubrication ring for transporting a lubricant from a lubricant container within a bearing. The disclosure is further directed a bearing for a pump as well as a pump with such a bearing.

Background Information

Lubrication rings can supply lubricant to bearings, which are needed for the bearing of a rotating shaft, of e.g. pumps. Especially in horizontally arranged pumps this is a known technology. Herein the lubrication ring hangs loosely at the shaft or at a part which is connected to the shaft in a torque-proof way, such as, e.g., an oil slinger, and reaches into a lubricant container attached below the shaft, e.g. within the floor of the bearing housing. If the shaft rotates, the lubrication ring rotates with it and transports the lubricant to the bearing structure. The bearing structure, which is lubricated and also cooled with such lubrication rings, can be designed as rolling bearing, e.g., as a ball bearing or as a friction bearing.

SUMMARY

An important application for such lubrication rings are pumps, for example those pumps, which are used in the energy sector, in the oil and gas industry or in the electricity production industry, the chemical industry, the water industry or the pulp and paper industry. Especially during the conveyance of hydrocarbons in the oil and gas industry pumps which are often subjected to extremely hard operating conditions. As a consequence, the lubrication and the cooling of the bearing also must be guaranteed reliably even in extreme operating conditions. An insufficient or missing lubrication harms the bearing and can lead to a severe damaging or even the failure of the bearing and thus of the pump. Especially during usages of the pump in difficult to access areas the total failure of a bearing of a pump or a pump is a serious incident, which can lead to great economical losses.

To optimize the lubricant supply by a lubrication ring several options have already been proposed. One such option concerns the optimizing of the surfaces of the lubrication ring. In a conventional lubrication ring, the surfaces intended for the transportation of the lubricant from the lubricant container to the bearing structure are smooth. From US 2017/0370523 A1 a lubrication ring with altered surfaces is known. Herein the radially outer surface of the lubrication ring (in the following also referred to as transport surface) and/or the radially inner surface (in the following also referred to as running surface) and/or the side surfaces, meaning those surfaces, which limit the lubrication ring in axial direction, entirely or partially include an electrostatic coating, so that an electrostatic attraction is exerted on the lubricant. In comparison to the conventional lubrication ring this increases the amount of lubricant conveyed. It has been determined that these lubrication rings do also have disadvantages, however. The transferring rate of the lubricant from the lubricant container to the bearing structure is dependent on the rotating speed of the shaft. The rotating speed of the lubricant ring is indeed significantly lower than that of the shaft, but particularly during high rotating speeds of the shaft it is still high enough so that the centrifugal force prevails against the Coulomb force, whereby the lubricant no longer remains stuck to the lubrication ring but is rather catapulted away before it reaches the bearing structure. Hereby the amount of lubricant transported per time decreases. This does not only have a negative effect on the lubrication of the bearing but also on the cooling of the same. The lubricant is also used for the removal of the warmth originating from within the bearing, meaning for the cooling of the bearing. This means that if a smaller amount of lubricant is transported per time, the drain of warmth is also lessened, In the worst case, this can lead to thermal deformation of the bearing or components of the bearing or shaft, which can destroy the entire pump.

Since lubrication rings are the only components which supply lubricant to lubrication ring lubricated bearings, their performance is directly tied to the operating security or process security in relation to lubrication and cooling. An improvement of these lubrication rings can lead to an improvement of the bearings in relation to attrition, application limitations, such as e.g. high or low speed operating and bearing temperature, whereby the risk of bearing failures is reduced drastically.

Starting from this state of the art it is thus an objective of the disclosure to propose a lubrication ring for a bearing which guarantees an improved lubrication of the bearing structure. Further it is an objective of the disclosure to propose a bearing as a well as a pump with such a lubrication ring.

The subject of embodiments of the disclosure meeting this objective is characterized by the features disclosed herein.

Thus, a lubrication ring for the transport of a lubricant from a lubricant container in a bearing is proposed by the disclosure, wherein the lubrication ring is designed for driving by a rotating shaft, which is borne by the bearing, wherein the lubrication ring has a running surface for the interoperation with the shaft as well as a transport surface for the transport of the lubricant. According to the disclosure the transport surface has several pockets for the transport of the lubricant, which are arranged adjacent to each other in circumferential direction of the lubrication ring.

In the operating state, the lubrication ring hangs loosely at the shaft or at a part which is connected to the shaft in a torque-proof way, such as, e.g., an oil slinger, and reaches into a lubricant container attached below the shaft, e.g. within the floor of the bearing housing. This means in particular that the lubrication ring can rotate relative to the shaft, i.e. the lubrication ring rotates at a different speed than the shaft. Usually, the lubrication ring rotates at a lower rotational speed than the shaft. The lubrication ring is driven by the friction between the shaft or a part which is connected to the shaft in a torque-proof way and the running surface of the rotating ring.

Since the lubrication ring usually hangs down from the shaft, the lubrication ring is also not centered on the shaft. As a result, the lubrication ring rotates around a different axis of rotation than the shaft in the operating state.

As the term "ring" indicates—the lubricating ring is designed as a ring-shaped body, preferably as a circular ring-shaped body. In particular, the lubrication ring is not designed as a circular disk or an annular disk. In particular, the lubrication ring is not connected to the shaft in a torque-proof way.

The pockets lead to a significant increase of transported lubricant per time. During operation the pockets are filled with lubricant from the lubricant container and transported to the bearing structure by the rotation of the lubrication ring. In contrast to, e.g., simple impellers, the pockets are limited by rims at their sides parallel to the circumferential direction, whereby no lubricant drips from the lubrication ring in unwanted places. An additional advantage, which results during operation by the embodiment with the pockets, is that, in comparison to conventional lubrication rings, the texture with the pockets causes stronger turbulences within the lubricant container, which results in a better mixing of the lubricant within the lubricant container. Hereby the temperature layers within the lubricant container are at least significantly reduced, so that the temperature of the lubricant is more homogenous. Additionally, an additional cooling effect is achieved by the additional splashing of the lubricant in the bearing, which is advantageous for the draining of warmth from the bearing.

The lubrication ring has a thickness in radial direction. As generally common, the radial direction refers to the direction, which is directed radially outward from the geometrical center of the lubrication ring. In view of a transport rate for the lubricant which is as good as possible it has shown to be advantageous that every pocket has a depth, which is at least ten percent of the thickness of the lubrication ring.

Preferably the lubrication ring has at least 30 pockets and at most 60 pockets. Especially the embodiment of the lubrication ring with 45-50 pockets has shown to be especially effective in usage within pumps.

It is further preferred, that two adjacent pockets are respectively separated from each other by a web. This means, if one regards only one pocket, there is a web on each of its ends in circumferential direction.

In a preferred embodiment, each web hereby encloses an angle different from 90° with the circumferential direction.

It has shown to be especially advantageous in view of an optimal transport rate for the lubricant, if the angle amounts at most 60° and specifically around 40°.

In another preferred embodiment, each web extends in a radial direction, i.e. each web encloses an angle of 90° with the circumferential direction. This embodiment has the advantage that the lubricating ring can be used regardless of the direction of rotation of the shaft. This means that in this embodiment, the lubrication ring can rotate in both directions, i.e. clockwise and counterclockwise, without changing the delivery rate. The lubrication ring is therefore equally suitable for both directions of shaft rotation.

Due to the embodiment with the webs in combination with the pockets in the transport surface a kind of mill wheel is formed, which can transport the lubricant from the lubricant container to the bearing structure more effectively.

In some embodiments each pocket is limited by a concave surface in regard to the radial direction. Like this the transporting of lubricant can be optimized further. Similarly, it has been shown that a production of such pockets is easier construction wise.

According to a preferred embodiment the running surface of the lubrication ring has several radial grooves. Viewed in the circumferential direction these stretch across the entire running surface. Preferably the grooves are arranged parallel to each other. This embodiment offers the advantage of better force transmission from the shaft to the lubrication ring. For a dependable and sufficient transport of lubricant it is advantageous that the lubrication ring is reliably driven to rotation by the shaft. The rotational speeds of a conventional lubrication ring are significantly lower than those of the shaft itself. Thus, the embodiment with the grooves in the running surface is preferred because the friction of the lubrication ring on the shaft is thereby increased and thus an improved force transmission is produced.

Here it must be mentioned that the grooves are not mandatory for the reliable operation of the lubrication ring according to the disclosure, but rather only constitute an especially preferred embodiment. Embodiments of the lubrication ring according to the disclosure with a different design of the running surface, for example a smooth running surface, are also possible.

The running surface and/or the transport surface of the lubrication ring preferably includes a synthetic material. Suitable synthetic materials are, for example, polyactides (polyactic acid: PLA) or polytetrafluoroethene (PTFE) known under the trade name TEFLON. Thus, embodiments are possible in which both the transport surface and the running surface are made from a synthetic material, or such embodiments in which only one of the two surfaces is made from a synthetic material. Further it is possible that the transport surface is made from a different synthetic material than the running surface.

The manufacturing of the two surfaces, meaning the transport surface and the running surface from a synthetic material provides some advantages. For example, in the manufacturing of the running surface from a synthetic material not only the improved force transmission from the shaft to the lubrication ring is advantageous, but also that the lubrication ring has better gliding properties, which protects the shaft, or the part connected to the shaft in a torque-proof way, from attrition. In conventional lubricating rings this attrition occurs because the lubrication ring is usually made from a metal, which, due to its hardness, wears away material from the shaft or the part connected to the shaft in a torque-proof way. This does not only lead to the shaft or the part connected to the shaft in a torque-proof way being damaged, but leads to metal particles getting into the lubricant and this being transported into the bearing structure by the lubrication ring. This can lead both to damage at the shaft as well as at the bearing, which, in the worst case, results in the failure of the entire pump.

According to a first preferred embodiment the lubrication ring has a construction in several parts. Hereby the lubrication ring comprises an inner part, a middle part, and an outer part, each of which is designed in a ring shape, wherein the middle part is arranged in between the inner part and the outer part viewed in radial direction, wherein the inner part includes the running surface and wherein the outer part includes the transport surface. The inner part herein has the smallest radius, and the outer part has the largest radius.

Preferably, the middle part is manufactured from a metallic material, especially a stainless steel. This has the advantage that the lubrication ring has a higher mass without a change of its outer dimensions (compared to an embodiment which is fully non-metallic, for example an embodiment made entirely from synthetic materials). Hereby the contact pressure on the shaft or the part connected to the shaft in a torque-proof way is increased. This leads to an improvement in the driving of the lubrication ring and thus of the lubricant transport. Through the improved driving, higher rotational speeds of the lubrication ring can be achieved, which has the additional advantage, that the lubricant, especially within the lubricant container, is mixed significantly better. Hereby a temperature layering within the lubricant container can be at least significantly reduced, which results in a better draining of warmth from the bearing.

Since, in this embodiment of the lubrication ring its mass is increased without its outer dimensions being changed, there is also the opportunity, to upgrade already existing pumps or pumps already in operation with such an embodiment of the lubrication ring according to the disclosure. This embodiment is thus an efficient and material-friendly alternative for replacing conventional lubrication rings and thus for optimization the transporting of lubricant. Through the equal distribution of the mass added by the metallic middle part across the entire lubrication ring neither the friction between the lubrication ring and the lubricant inside the lubricant container is increased, nor do deformations of the lubrication ring caused by unequal weight distributions occur, which could lead to worse running properties.

Equally, a combination of increasing of the mass of the lubrication ring and the grooves in the running surface to improve the force transmission from the shaft onto the lubrication ring can also be provided.

According to a second preferred embodiment, the inner part and the outer part envelop the middle part. Depending on the embodiment the envelopment can be complete, meaning that the middle part is fully enveloped by the inner part and the outer part or only partial, meaning that the middle part is not fully enveloped.

The outer part and the inner part are preferably designed with an L-shaped profile. Herein the long leg of the of the L-shaped inner part forms the running surface and the long leg of the L-shaped outer part forms the transport surface. The two short legs of the L-shaped profiles envelop the middle part.

Other embodiments of the inner part or the outer part are also possible, however. For example, the inner part can be designed with a U-shaped profile, and the outer part with a rectangular profile or vice versa, the outer part with a U-shaped profile and the inner part with a rectangular profile. Similarly, the inner part and the outer part can be designed with a U-shaped profile.

Especially the three-part embodiment of the lubrication ring offers the opportunity to optimally adjust the lubrication ring for the respective usage, because the running surface can be optimized with regard to the drive of the lubrication ring and to the lowest possible attrition of the shaft or the lubrication ring, while the transport surface with the pockets can be optimized with regard to the transport rate achieved for the lubricant. With the middle part, the mass of the lubrication ring can be increased.

A bearing for a pump is further proposed by the disclosure, with a shaft for rotating around an axial direction, comprising a bearing housing and a bearing cover, which is attached to the bearing housing, further comprising a bearing structure for bearing the shaft, a lubricant container for a lubricant, a lubrication ring for transporting the lubricant and supplying the bearing structure with the lubricant, wherein the lubrication ring is arranged to be driven by the rotating shaft. The lubrication ring is designed according to the disclosure.

Further a pump is proposed, which comprises at least one bearing which is designed according to the disclosure, meaning especially designed with a lubrication ring according to the disclosure.

The pump is preferably a centrifugal pump.

BRIEF DESCRIPTION OF THE DRAWINGS

In the following, embodiments of the invention will be more closely explained using the drawings. In the drawing, it is shown.

DETAILED DESCRIPTION

Figure 1:
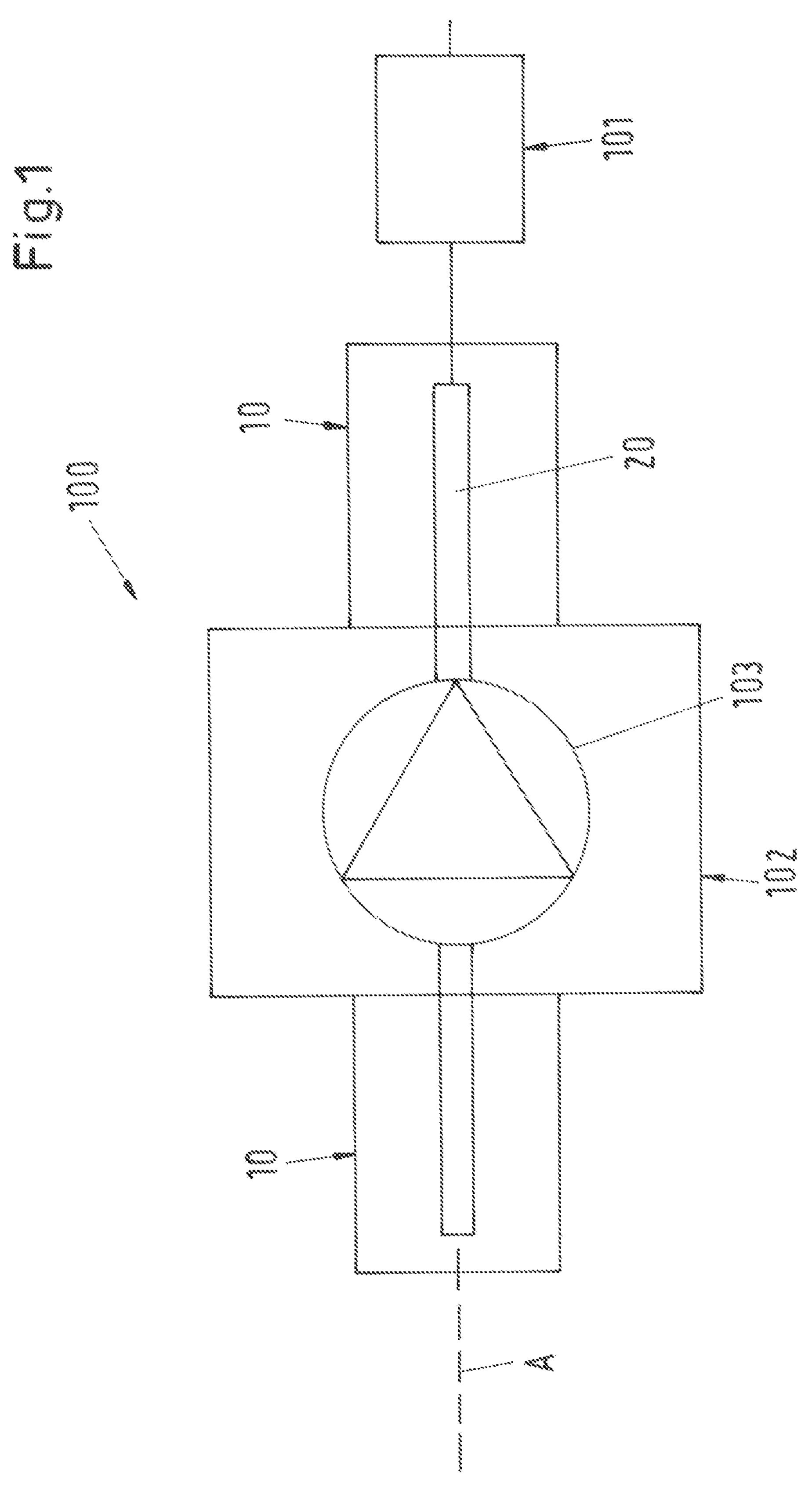
FIG. 1 illustrates a schematic depiction of an embodiment of a pump according to the disclosure.

The disclosure concerns a lubrication ring for a bearing for a pump with a rotating shaft, as well as a bearing for a pump, which is supplied with lubricant by such a lubrication ring. FIG. 1 shows a schematic depiction of an embodiment of such a pump, which is designated with the reference sign 100 in its entirety. The pump 100 is a horizontal, between bearing centrifugal pump, as is used, for example, as process pump in the oil and gas industry. The pump 100 comprises an impeller unit 102 with a centrifugal rotor 103 for conveying a liquid from an inlet to an outlet (not depicted). The rotor 103 is mounted on a shaft 20, which is rotatable around an axis A and drives the rotor for rotation around the axis A. On each side of the impeller unit 102 a bearing 10 for bearing of the shaft 20 is provided. The details of the bearing 10 are described more closely in the following. Since the impeller unit 102 is arranged in between the two bearings 10, the pump 100 is also described as between bearing pump. Additionally, there is a drive 101, for example an electric motor, which rotates the shaft 20 of the pump 100.

It is self-evident, that the disclosure is not limited to between bearing pumps, but can be applied to all types of pumps, which use lubrication rings for lubrication (e.g., overhung pumps). The disclosure is especially suited for all types of pumps, which have bearings with annular oil lubrication, in which the lubricant needs to be transported to a bearing structure. However, the disclosure is also suited for bearings with oil splash lubrication, in which the bearing structure is arranged directly in the lubricant. In oil splash lubrication, a stronger or better splashing of the lubricant can be achieved by the disclosure, which improves the cooling effect.

Figure 2:
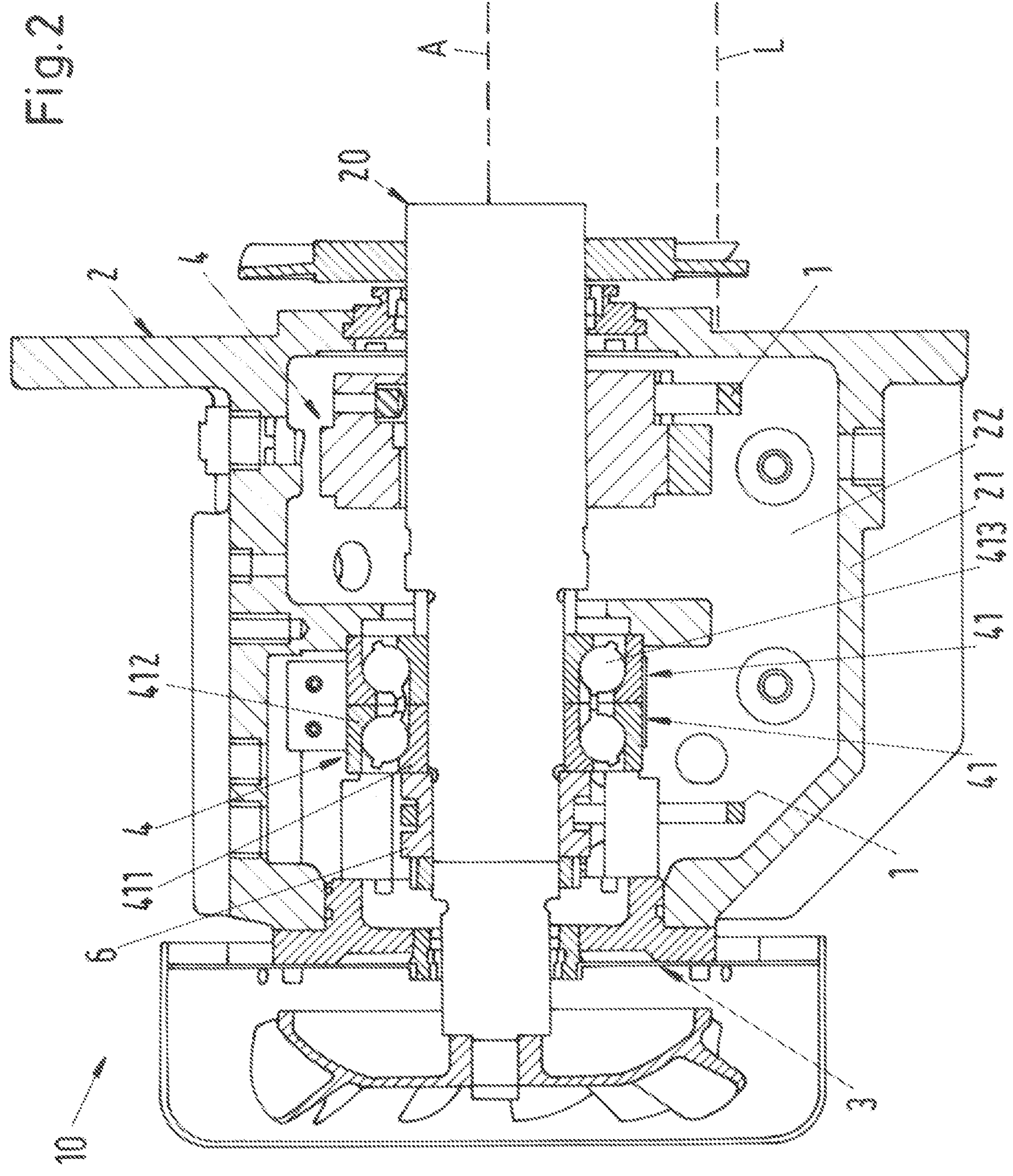
FIG. 2 illustrates a sectional view of an embodiment of a bearing according to the disclosure.

FIG. 2 depicts a sectional view of an embodiment of a bearing 10 according to the disclosure with lubrication rings 1 included within it. The bearing 10 comprises a bearing housing 2 and a bearing cover 3, which is attached to the bearing housing 2 by means of screws or bolts for example. Additionally, there are two bearing structures 4 for the reception and bearing of the shaft 20 of the pump 100 present in a manner known per se. The left bearing structure 4 according to the depiction, serves as axial bearing and here includes two ball bearing elements 41, each of which comprises an inner bearing ring 411, an outer bearing ring 412 and a multitude of balls 413 as rolling bodies, respectively, which are arranged in between the outer bearing ring 412 and the inner bearing ring 411. The inner bearing ring is connected to the shaft 20 in a torque-proof way, and the outer bearing ring 412 is location-proof in relation to the bearing housing 2. For the lubrication and the cooling of the bearing structure 4 the lubrication ring 1 is provided. The lubrication ring 1 is arranged in a groove in a sleeve-like oil slinger 6, which is connected to the shaft 20 in a torque-proof way, and which rotates with the shaft 20. At a floor 21 of the bearing housing 2 of the bearing 10 a lubricant container 22 for a lubricant, for example an oil, is provided. During operation of the pump 100 the lubricant container 22 is filled with the lubricant up to a filling level indicated by the line L in FIG. 2. The lubrication ring 1 loosely hangs at the shaft 20 and is partially submerged in the lubricant within the lubricant container 22. When the shaft 20 rotates, the lubrication ring 1 also rotates and thus transports the lubricant from the lubricant container 22 to the oil slinger 6, which releases the lubricant to the bearing structure 4. The right bearing structure 4, according to the depiction, serves as radial bearing and is designed as a friction bearing here. For this bearing structure 4, designed as a friction bearing, a lubrication ring 4 is also provided, which hangs directly on the shaft 20 and transports the lubricant from the lubricant container 22 to the bearing structure 4.

The lubrication ring 1 hangs loosely on the shaft 20 or the oil slinger 6 and is driven for rotation around the shaft 20 by the friction between the oil slinger 6 and the lubrication ring 1. The lubrication ring 1 is arranged eccentrically on the oil slinger 6 or the shaft 20, so that the lubrication ring 1 rotates around a different axis of rotation than the shaft 20 in the operating state. The friction between the lubrication ring 1 and the oil slinger 20 is caused by the gravitational force acting on the lubrication ring. As already mentioned, the lubrication ring 1 rotates relative to the shaft 20 in the operating state. The rotational speed of the lubrication ring 1 is lower than the rotational speed of the shaft.

Preferably, the lubrication ring 1 is designed as a ring-shaped body, in particular as a circular ring-shaped body. In the preferred embodiment of the lubrication ring 1 for ring oil lubrication, the lubricant container 22 is arranged below (with respect to the vertical direction determined by gravity) the shaft 20. The bearing structures 4 are arranged above the line L, i.e. the bearing structures 4 are not immersed in the lubricant in the lubricant container 22, but a part of the lubricating ring 1 hanging down from the shaft 20 is immersed in the lubricant in the lubricant container 22 and transports the lubricant from the lubricant container 22 into the area of the bearing structures 4 when the lubricating ring 1 rotates.

Figure 3:
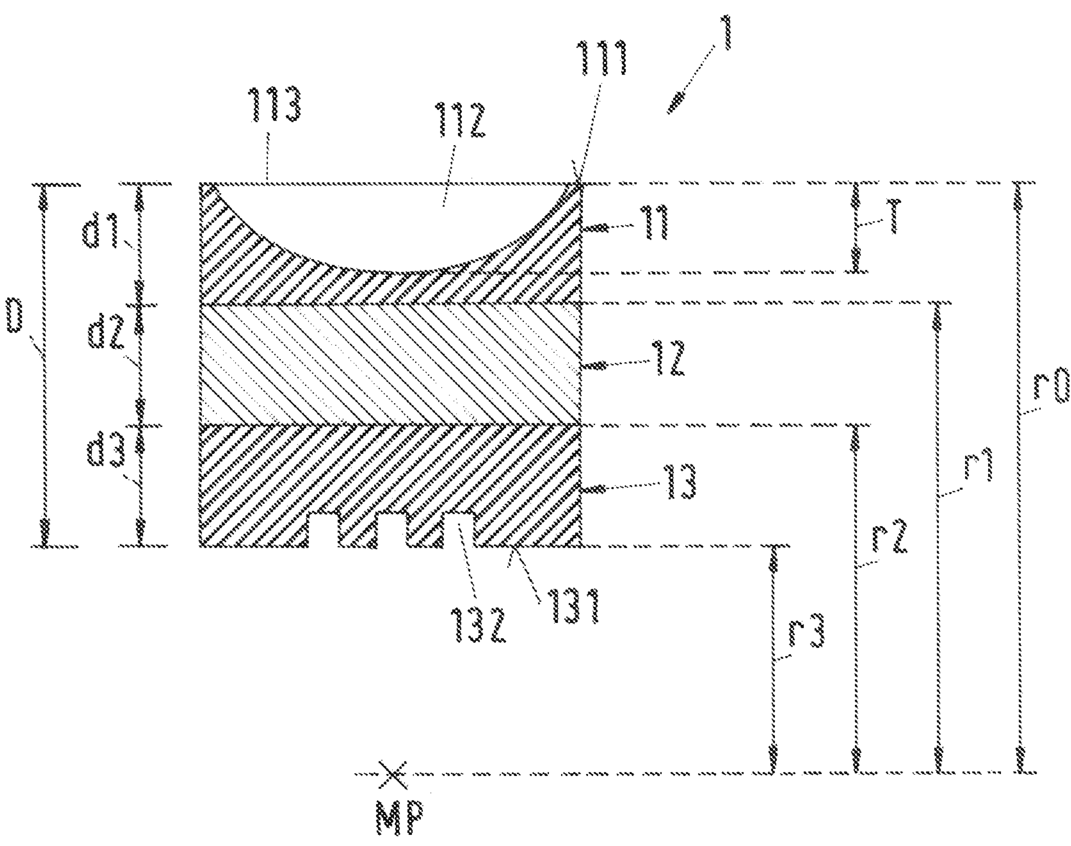
FIG. 3 illustrates a schematic sectional view of a first embodiment of a lubrication ring according to the disclosure.

FIG. 3 depicts a schematic sectional view of a first embodiment of a lubrication ring 1 according to the disclosure. The lubrication ring 1 here comprises an outer part 11 with a transport surface 111, a middle part 12 and an inner part 13 with a running surface 131. The running surface 131 is that surface of the lubrication ring 1, which cooperates with the shaft 20 or the oil slinger 6 to drive the lubrication ring 1. The transport surface 111 is that surface of the lubrication ring 1 which primarily serves the transporting of the lubricant. The running surface 131 is the radially internally located surface, and the transport surface 111 is the radially externally located surface of the lubrication ring 1.

All three parts 11, 12, 13 are designed in each case in a ring shape. The three individual parts 11, 12, 13 are arranged in such a way, that they have the same geometrical center MP. The outer part 11 has a radius r1 and a thickness d1, the middle part 12 a radius r2 and a thickness d2 and the inner part 13 has a radius r3 and a thickness d3. r0 refers to the outer radius of the entire lubrication ring 1. The three ring shaped parts 11, 12, 13 are designed in such a way that $$r3<r2<r1<r0,$$

wherein r2=r3+d3, r1=r2+d2 and r0=r1+d1 is given.

The thickness d1, d2, d3 respectively refers to the extension of the respective part 11, 12, 13 in radial direction. The thickness D of the lubrication ring 1 is then a sum of d1, d2 and d3. This means that the three ring shaped parts are arranged adjacent to each other, so that, viewed in radial direction, a multi-layer lubrication ring is formed.

In the outer part 11 several pockets 112 are disposed in the transport surface 111. These are respectively designed as indentations in the transport surface 111 of the outer part 11. Several of these pockets 112 are arranged adjacent to each other in circumferential direction across the entire lubrication ring 1. The separation between two adjacent pockets in circumferential direction occurs by a web 113 in each case.

Each pocket 112 is preferably designed as a concave recess. As such, each pocket 112 is limited by a concave surface in regard to the radial direction. Each pocket 112 preferably has a depth T, which is at least 10% of the thickness D of the lubrication ring 1. This measure is advantageous to achieve an especially good transport rate for the lubricant.

In the inner part 13 in the running surface 131 several, here three, grooves 132 are provided. These grooves 132 run parallel to each other and stretch across the entire running surface 131 of the lubrication ring 1 in circumferential direction. The outer part 11 and/or the inner part 13 are preferably made from a synthetic material, for example from a polyactic acid (PLA) or from polytetrafluorethene (PTFE). The middle part 12 is preferable made from a metallic material, preferably a stainless steel. This has the advantage that the lubrication ring has a higher mass (in comparison with a fully non-metallic embodiment, for example an embodiment made entirely from a synthetic material), without a change to its outer dimensions. In this way, the contact pressure on the shaft or on the oil slinger 6 which is connected to the shaft 20 in a torque-proof way, is increased. This has the effect, that the drive of the lubrication ring 1 and thus the transporting of lubricant is improved.

To guarantee a good drive of the lubrication ring, it has shown to be advantageous if each of the grooves 132 has a depth of at least one millimeter. It is further preferred, that each of the grooves has a width of at least one millimeter. Here the depth of the groove 132 is its maximum extension in the radial direction and the width of the groove 132 is its extension in that direction, which stands vertically on the radial direction and vertically on the circumferential direction.

According to a version of the first embodiment the running surface 131 is designed to be smooth, meaning there are no grooves 132 in the running surface 131.

Figure 4:
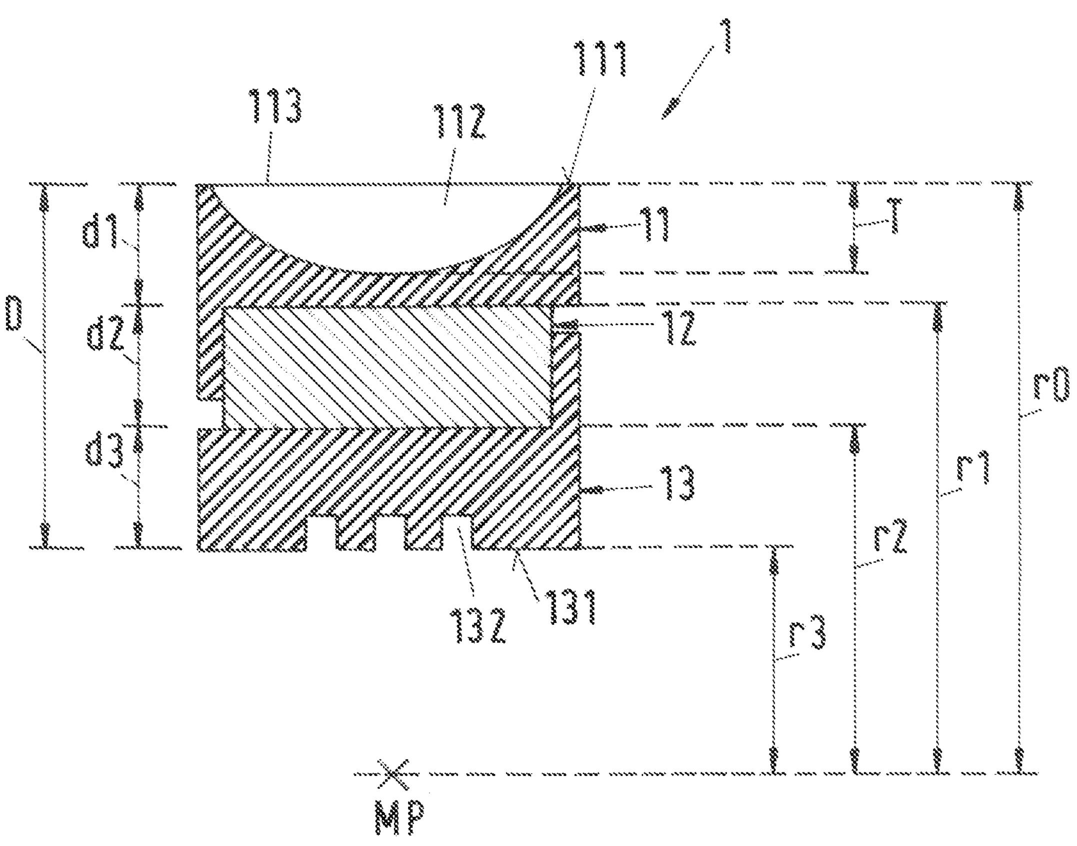
FIG. 4 illustrates a schematic sectional view of a second embodiment of a lubrication ring according to the disclosure.

FIG. 4 depicts a schematic sectional view of a second embodiment of a lubrication ring 1 according to the disclosure. Here the lubrication ring 1 again has the composition with the three parts 11, 12, 13. In the following, only differences between the second embodiment and the previously described first embodiment will be discussed more closely. Equal components or functionally equal components of the second embodiment are designated with the same reference signs as in the first embodiment. It is understood that all previous explanations of the first embodiment are also valid in the same manner or in analogously the same manner to the second embodiment.

In the second embodiment the outer part 11 and the inner part 13 are designed in such a way that they envelop, or surround, the middle part 12. The envelopment can, depending on the version, be complete so that the middle part 12 is fully enveloped by the outer part 11 and the inner part 13, or alternatively as shown in FIG. 4, only be partial, so that the middle part 12 is not fully enveloped. The profiles of the outer part 11 and the inner part 13, respectively, are each designed in an L-shape in the second embodiment. Other profiles are also possible, however. Further possible embodiments can be designed with a U-shaped outer part 11 and a rectangular inner part 13 or a rectangular outer part 11 and a U-shaped inner part 13. Similarly, it is possible, that both the outer part 11 as well as the outer part 13 have a U-shape.

The three parts 11, 12, 13 are connected to each other in a torque-proof way. For this purpose, an adhesive connection or a welded connection can be provided. It is also possible to connect the three parts 11, 12, 13 to each other via a press fit so that an interference fit is formed.

Naturally, additional embodiments of a lubrication ring 1 are possible. The lubrication ring 1 can be designed in one piece, or be made from two parts or from more than three parts 11, 12, 13. In every case the lubrication ring 1 has a transport surface 111 designed according to the disclosure as well as a running surface 131 which is designed with or without grooves 132.

Figure 5:
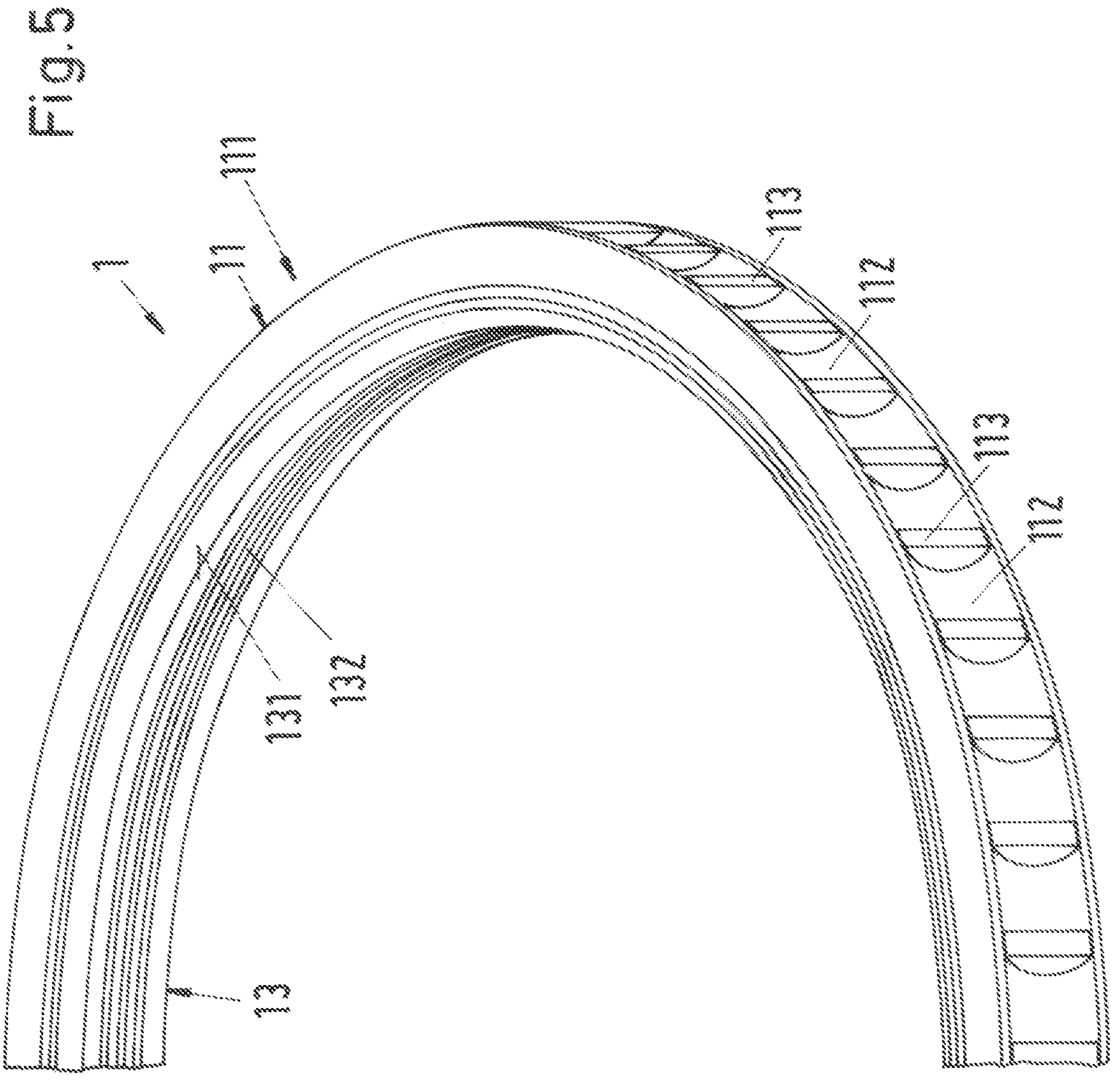
FIG. 5 illustrates a perspective depiction of a part of the second embodiment.

FIG. 5 depicts a perspective depiction of a part of the second embodiment. Here the outer part 11 with the transport surface 111 and the several pockets 112, arranged adjacent, which are respectively separated from each other by webs 113, and the inner part 13 with the running surface 131 and the grooves 132 present therein, arranged parallel to each other, are depicted.

Figure 6:
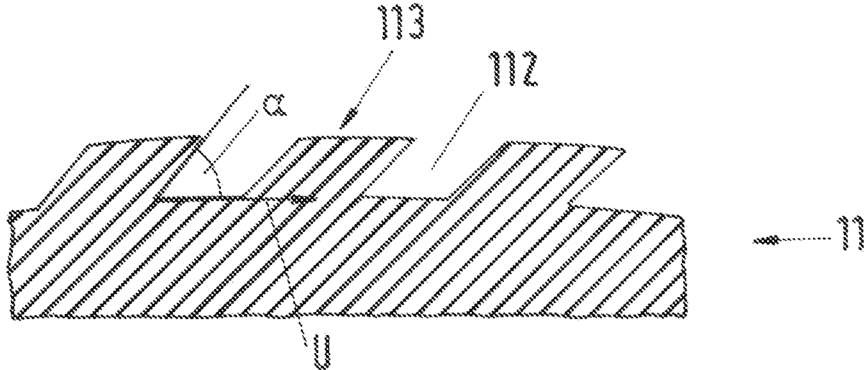
FIG. 6 illustrates a detailed depiction of the outer part.

FIG. 6 depicts a detailed depiction of the outer part 11. This embodiment of the outer part 11 is suitable in an analogous way both for the first embodiment (FIG. 3) as well as for the second embodiment (FIG. 4). Here several adjacent pockets 112 are present in the outer part 11, wherein two adjacent pockets are respectively separated by a web 113. The webs 113 enclose an angle $\alpha$ different from 90° with the circumferential direction U. The angle $\alpha$ is preferably 60° at most. Especially preferred, the angle $\alpha$ is around 40°. An angle $\alpha$ different from 90° is advantageous with regard to the transport properties of the lubrication ring 1. Basically, embodiments are also possible, in which the webs 113 are designed with an angle $\alpha$ of 90° to the circumferential direction U, however for many applications an angle $\alpha$ of significantly less than 90°, for example 40°, is preferred so that the pockets have a more hydrodynamically convenient shape. An embodiment with the angle $\alpha$ equal to 90° can lead to increased friction between the lubrication ring 1 and the lubricant in the lubricant container 22. Additionally, the embodiment with the angle $\alpha$ of less than 90° leads to a better containment of the lubricant for the transport in the pockets 112. This is because, for example, webs with an angle $\alpha$ of 90° are less capable of avoiding draining of the lubricant due to the forces occurring because of the rotation of the lubrication ring 1, particularly at lower rotational speeds. Thus, with regard to optimal transport properties such embodiments are preferred, in which the webs 113 enclose an acute angle $\alpha$ with the circumferential direction U, meaning an angle $\alpha$ of less than 90°.

Of course, embodiments in which the angle $\alpha$ is 90° are also possible and preferred, i.e. the webs 113 extend in a radial direction. This embodiment has the advantage that the function of the lubrication ring 1 is independent of the direction of rotation of the lubrication ring 1, i.e. the lubrication ring 1 has at least substantially the same properties, in particular with regard to the delivery rate, when it rotates clockwise as when it rotates counterclockwise. This independence of the functionality of the lubrication ring 1 represents a considerable advantage, particularly for assembly.

Both in the first as well as in the second embodiment the lubrication ring 1 preferably has at least 30 pockets 112 and at most 60 pockets 112. Especially the embodiment of the lubrication ring 1 with 45-50 pockets has been shown to be especially effective in usage of the lubrication ring in pumps 100.

What is claimed is:

1. A lubrication ring for the transport of a lubricant from a lubricant container in a bearing, the lubrication ring to be driven by a rotating shaft, which is borne by the bearing, the lubrication ring comprising:

- a running surface configured to interoperate with the shaft; and
- a transport surface configured to transport lubricant, the transport surface having a first and second axial surfaces and plurality of pockets to transport of the lubricant, the plurality of pockets arranged adjacent to each other in a circumferential direction of the lubrication ring between the first and second axial surfaces and being formed at an angle different from 90 degrees, the running surface having a plurality of radial grooves which, when viewed in the circumferential direction, stretch across an entirety of the running surface.

2. The lubrication ring according to claim 1, wherein the plurality of pockets are disposed between the first and second axial surfaces so as to not be exposed in the axial direction.

3. A lubrication ring for the transport of a lubricant from a lubricant container in a bearing, the lubrication ring to be driven by a rotating shaft, which is borne by the bearing, the lubrication ring comprising:

- a running surface configured to interoperate with the shaft; and
- a transport surface configured to transport lubricant, the transport surface having a plurality of pockets to transport of the lubricant, the plurality of pockets arranged adjacent to each other in a circumferential direction of the lubrication ring, the running surface having a plurality of radial grooves which, when viewed in the circumferential direction, stretch across an entirety of the running surface.

4. The lubrication ring according to claim 3, wherein the lubrication ring has a thickness in a radial direction, and each pocket of the plurality of pockets has a depth which is at least 10 percent of the thickness of the lubrication ring.

5. The lubrication ring according to claim 3, wherein the plurality of pockets includes at least 30 pockets and at most 60 pockets.

6. The lubrication ring according to claim 3, wherein two adjacent pockets of the plurality of pockets are separated from each other by a web.

7. The lubrication ring according to claim 6, wherein the web forms the angle, different from 90°, and the angle is formed relative with the circumferential direction of the lubrication ring.

8. The lubrication ring according to claim 7, wherein the angle is at most 60°.

9. The lubrication ring according to claim 7, wherein the angle is 40°.

10. The lubrication ring according to claim 3, wherein, relative to a radial direction of the lubrication ring, each pocket of the plurality of pockets is limited by a concave surface.

11. The lubrication ring according to claim 3, wherein the running surface is made from a synthetic material.

12. The lubrication ring according to claim 3, wherein the transport surface is made from a synthetic material.

13. The lubrication ring according to claim 3, wherein the lubrication ring includes an inner part, a middle part, and an outer part, each of the inner part, the middle part, and the outer part having a ring shape, when viewed in a radial direction, the middle part is arranged in between the inner part and the outer part, the inner part includes the running surface and the outer part includes the transport surface.

14. The lubrication ring according to claim 13 wherein the middle part is made from a metallic material.

15. The lubrication ring according to claim 13, wherein the inner part and the outer part encase the middle part.

16. The lubrication ring according to claim 13 wherein the middle part is made from stainless steel.

17. A bearing for a pump with a shaft for rotating around an axial direction, the bearing comprising:

- a bearing housing;
- a bearing cover attached to the bearing housing;
- a bearing structure configured to bear the shaft;
- a lubricant container for a lubricant;
- the lubrication ring according to claim 3, the lubrication ring configured to transport the lubricant and to supply the bearing structure with the lubricant, the lubrication ring configured to be driven by the rotating shaft.

18. A pump, comprising:

- a bearing comprising a bearing housing, a bearing cover attached to the bearing housing, a bearing structure configured to bear the shaft, a lubricant container for a lubricant, the lubrication ring according to claim 3, the lubrication ring configured to transport the lubricant and to supply the bearing structure with the lubricant, the lubrication ring configured to be driven by the rotating shaft.

19. The lubrication ring according to claim 3, wherein the plurality of radial grooves are arranged parallel to each other.

20. A lubrication ring for the transport of a lubricant from a lubricant container in a bearing, the lubrication ring to be driven by a rotating shaft, which is borne by the bearing, the lubrication ring comprising:

- a running surface configured to interoperate with the shaft and having a plurality of radial grooves which, when viewed in the circumferential direction, stretch across an entirety of the running surface, and are arranged parallel to each other; and
- a transport surface configured to transport lubricant, the transport surface having a plurality of pockets to transport of the lubricant, the plurality of pockets arranged adjacent to each other in a circumferential direction of the lubrication ring.

* * * * *